US012506257B2

(12) United States Patent
Li et al.

(10) Patent No.: US 12,506,257 B2
(45) Date of Patent: Dec. 23, 2025

(54) ANTENNA VIBRATOR AND ANTENNA

(71) Applicant: Suzhou Luxshare Technology Co., Ltd., Jiangsu (CN)

(72) Inventors: Zhenhua Li, Suzhou (CN); Chengyu Xu, Suzhou (CN); Wenkai Xu, Suzhou (CN); Gang Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 180 days.

(21) Appl. No.: 18/199,155

(22) Filed: May 18, 2023

(65) Prior Publication Data

US 2024/0113422 A1 Apr. 4, 2024

(30) Foreign Application Priority Data

Sep. 30, 2022 (CN) ......................... 202211215022.0

(51) Int. Cl.
*H01Q 1/36* (2006.01)
*H01Q 1/42* (2006.01)

(52) U.S. Cl.
CPC ................. *H01Q 1/36* (2013.01); *H01Q 1/42* (2013.01)

(58) Field of Classification Search
CPC .......... H01Q 1/36; H01Q 1/42; H01Q 19/108; H01Q 21/24; H01Q 9/28; H01Q 1/246; H01Q 1/50; H01Q 1/52; H01Q 13/10; H01Q 9/04
See application file for complete search history.

(56) References Cited

U.S. PATENT DOCUMENTS

| | | | | |
|---|---|---|---|---|
| 7,079,079 | B2 * | 7/2006 | Jo | H01Q 9/0442 343/702 |
| 7,688,271 | B2 | 3/2010 | Cao et al. | |
| 2004/0217910 | A1 | 11/2004 | Montgomery et al. | |
| 2022/0029279 | A1 | 1/2022 | Jiang et al. | |

FOREIGN PATENT DOCUMENTS

| | | | | | |
|---|---|---|---|---|---|
| CN | 201994412 | U | | 9/2011 | |
| CN | 110247172 | A | | 9/2019 | |
| CN | 111541010 | A | * | 8/2020 | H01Q 1/36 |
| CN | 211670319 | U | * | 10/2020 | |
| CN | 211829186 | U | | 10/2020 | |
| CN | 212412193 | U | | 1/2021 | |
| CN | 212626051 | U | * | 2/2021 | |

(Continued)

*Primary Examiner* — Hoang V Nguyen
*Assistant Examiner* — Anna N Hamadyk
(74) *Attorney, Agent, or Firm* — Birch, Stewart, Kolasch & Birch, LLP

(57) ABSTRACT

The embodiments of the present disclosure provide an antenna vibrator and an antenna, and the antenna vibrator includes a radiation board. The radiation board is a polygon, a part of the radiation board bends downward to form a plurality of support portions and a plurality of hollowed holes, and a plurality of corners of the radiation board bend downward to form a plurality of bending angle portions. The support portion serves to support and connect. At the same time, by forming the bending angle portion on the radiation board, isolation of the vibrator is optimized, and after the vibrator is arrayed, a cross-polarization ratio meets a conventional indicator in a case of not adding a boundary condition.

18 Claims, 8 Drawing Sheets

(56) References Cited

FOREIGN PATENT DOCUMENTS

| | | | | |
|---|---|---|---|---|
| CN | 112467343 | A | | 3/2021 |
| CN | 214254715 | U | * | 9/2021 |
| CN | 114069212 | A | | 2/2022 |
| CN | 114361804 | A | | 4/2022 |
| CN | 216288941 | U | | 4/2022 |
| CN | 107579351 | B | | 4/2023 |
| CN | 218788504 | U | | 4/2023 |
| CN | 218827854 | U | | 4/2023 |
| TW | 200701559 | A | | 1/2007 |
| TW | 420057 | U1 | | 1/2012 |
| WO | WO 2021/046665 | A1 | | 3/2021 |
| WO | WO 2021/226837 | A1 | | 11/2021 |

* cited by examiner

ANTENNA VIBRATOR AND ANTENNA

CLAIM OF PRIORITY AND CROSS-REFERENCE TO RELATED APPLICATION(S)

This application claims the benefit of Chinese Patent Application No. 202211215022.0, filed on Sep. 30, 2022, which is incorporated herein by reference in its entirety.

BACKGROUND OF THE DISCLOSURE

1. Field of the Disclosure

The present disclosure relates to the technical field of communications, and in particular to an antenna vibrator and an antenna.

2. Description of the Related Art

A sheet metal stamping vibrator is a common vibrator used in 5G Massive Multiple Input Multiple Output (MIMO) base station antenna. In an array composed of the vibrators, optimization of a cross-polarization ratio may be implemented by adding a boundary condition (such as a sheet metal) to a sub-array, and light-weight requirement of the base station antenna structure may not be met.

BRIEF DESCRIPTION OF THE DISCLOSURE

In view of this, a purpose of the present disclosure is to provide an antenna vibrator and an antenna to implement that a cross-polarization ratio of the constituent array meets a conventional indicator without adding a boundary condition.

In a first aspect, the embodiments of the present disclosure provide an antenna vibrator including: a radiation board, where the radiation board is a polygon, a part of the radiation board bends downward to form a plurality of support portions and a plurality of hollowed holes, and a plurality of corners of the radiation board bend downward to form a plurality of bending angle portions.

Further, a height of the bending angle portion is greater than or equal to 0.045 center frequency wavelength and is less than or equal to 0.105 center frequency wavelength.

Further, the radiation board is square, and a side length of the radiation board is greater than or equal to 0.32 center frequency wavelengths and less than or equal to 0.42 center frequency wavelengths; and the four hollowed holes are uniformly distributed at a diagonal line of the radiation board.

Further, a diagonal line of the radiation board is vertical to a plane in which the corresponding bending angle portion is located.

Further, the hollowed hole includes a main part and a deflection part on the bending angle portion; and the main part is a rectangle, and a length of the main part is greater than or equal to 0.09 center frequency wavelength and is less than or equal to 0.15 center frequency wavelength.

Further, the support portion is bent downwards along the inner edge of the hollowed hole.

Further, a lower end of the support portion is bent to form a connecting portion.

Further, the height of the support portion is greater than or equal to 0.06 center frequency wavelengths and less than or equal to 0.12 center frequency wavelengths.

Further, the hollowed hole is a rectangle, and a width of the hollowed hole is greater than or equal to 0.025 center frequency wavelength and is less than or equal to 0.045 center frequency wavelength.

In a second aspect, an embodiment of the present disclosure further provides an antenna, including: a feed member; the antenna vibrator according to the first aspect, the antenna vibrator being electrically connected to the feed member through the support portion; and an antenna cover covering the antenna vibrator.

The embodiments of the present disclosure provide an antenna vibrator and an antenna, and the antenna vibrator includes a radiation board. The radiation board is a polygon, a part of the radiation board bends downward to form a plurality of support portions and a plurality of hollowed holes, and a plurality of corners of the radiation board bend downward to form a plurality of bending angle portions. The support portion serves to support and connect. At the same time, by forming the bending angle portion on the radiation board, isolation of the vibrator is optimized, and after the vibrator is arrayed, a cross-polarization ratio meets a conventional indicator in a case of not adding a boundary condition.

BRIEF DESCRIPTION OF THE DRAWINGS

The foregoing and other objects, features and advantages of the disclosure will become more apparent from the following description of embodiments of the disclosure with reference to the accompanying drawings, in which.

DETAILED DESCRIPTION OF EMBODIMENTS OF THE DISCLOSURE

The present disclosure is described below based on the embodiments, but the present disclosure is not limited thereto. In the following detailed description of the present disclosure, certain specific details are described in detail. The present disclosure may be fully understood by those skilled in the art without the description of these detailed parts. In order to avoid confusing the substance of the present disclosure, well-known methods, processes, flows, elements and circuits have not been described in detail.

In addition, it should be understood by those of ordinary skill in the art that the drawings provided herein are for illustrative purposes, and the drawings are not necessarily drawn to scale.

Unless expressly required in the context, the terms “include”, “comprise”, and other similar words should be construed as inclusive rather than exclusive or exhaustive, that is, the meaning of “including, but not limited to”.

In the description of the present disclosure, it should be understood that the terms “first”, “second”, etc. are merely used for descriptive purposes, but may not be understand as indicating or implying relative importance. In addition, in the description of the present disclosure, unless otherwise stated, “a plurality of” means two or more.

Figure 1:
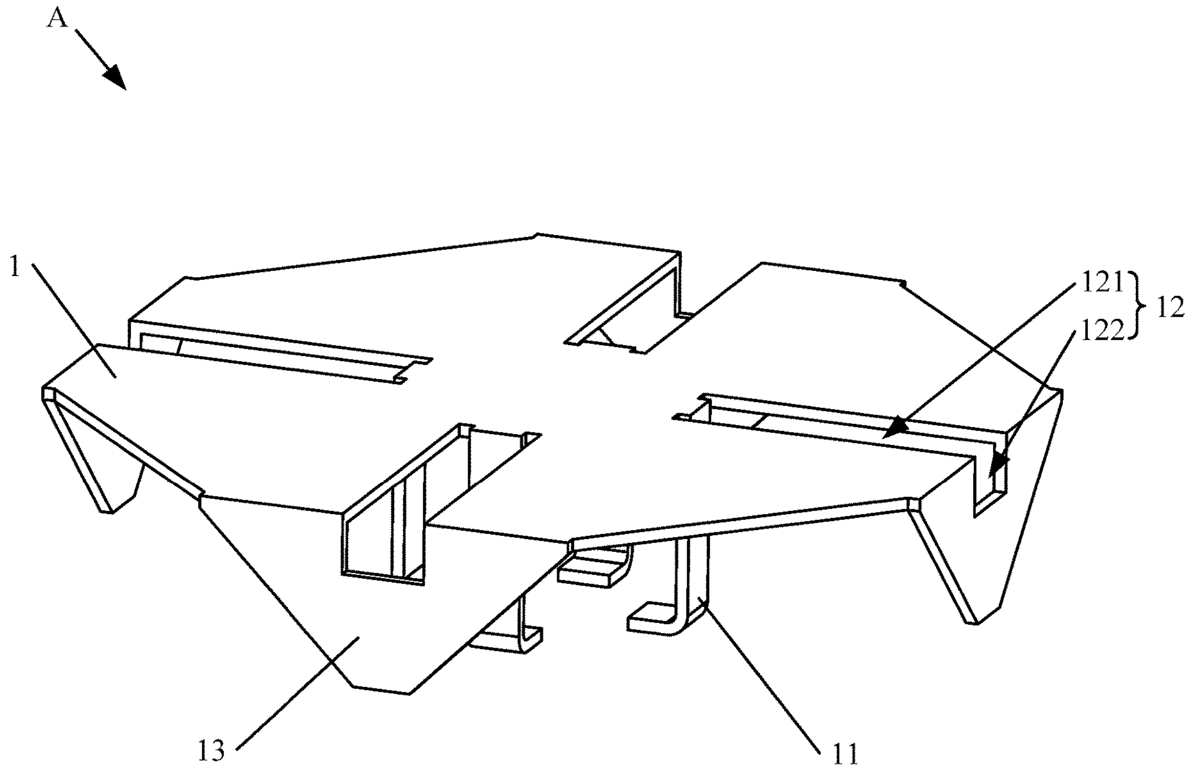
FIG. 1 is a schematic structural diagram of an antenna vibrator provided by a first embodiment of the present application.
Figure 2:
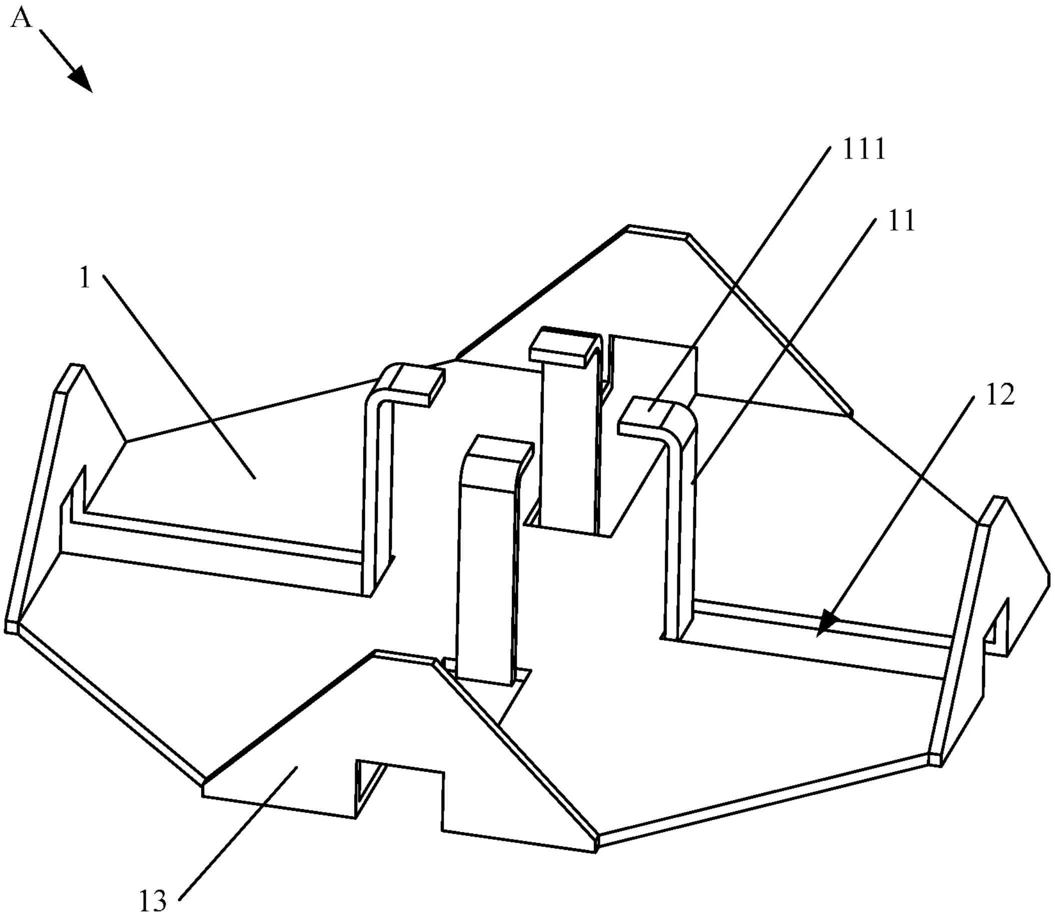
FIG. 2 is a schematic structural diagram of another view of an antenna vibrator provided by a first embodiment of the present application.

FIG. 1 is a schematic structural diagram of an antenna vibrator A provided by a first embodiment of the present application, and FIG. 2 is a schematic structural diagram of another view of an antenna vibrator A provided by a first embodiment of the present application. As shown in FIGS. 1 and 2, the antenna vibrator A includes a radiation board 1 used to transmit or receive a communication signal. Further, a part of the radiation board 1 bends downward to form a plurality of support portion 11 and a plurality of hollowed holes 12. The support portion 11 supports and feeds the radiation board 1. It should be noted that the antenna vibrator A in this embodiment is formed by stamping a sheet metal part (such as an aluminum or a copper sheet). In other words, after being stamped, the sheet metal part forms the radiation board 1 with a flat plate structure and the support portion 11 bending downwards, and the hollowed hole 12 is a through hole corresponding to the support portion 11 on the radiation board 1.

Furthermore, with reference to FIGS. 1 and 2, the antenna vibrator A of this embodiment is to improve a structure of the square radiation board 1. Specifically, four corners of the radiation board 1 bend downward to form four bending angle portions 13. Thus, the antenna vibrator A is integrally formed by stamping, the processing is simple and efficient, and the material cost is greatly reduced. It should be noted that, in an optional implementation, the bending angle portion 13 may be formed by bending several corners of the radiation board 1 downward, for example, two corners bend downward to form two bending angle portion 13. In another optional implementation, the radiation board 1 may be provided to a regular pentagon, a regular hexagon, and other symmetrical polygon shapes, and corners of corresponding numbers all bend downward to form a plurality of bending angle portions 13. Therefore, stability of a phase center of the antenna is ensured. In another aspect, the antenna vibrator A is formed by stamping a sheet thin sheet metal, that is, the radiation board 1 is a thin sheet metal, so that the design requirements of lightweight antenna are met.

It should be noted that by improving the radiation board 1, that is, by means of the bending angle portion 13 formed by stamping, the antenna vibrator A of this embodiment implements that isolation of the antenna vibrator A is optimized, and may enable a cross-polarization ratio after the antenna vibrator A is arrayed to meet a conventional indicator in a case of not adding a boundary condition. In another aspect, providing the hollowed hole 12 on the radiation board 1 is helpful to reduce the weight of the antenna vibrator A, so as to implement weight reduction of the antenna vibrator A and the antenna.

Figure 4:
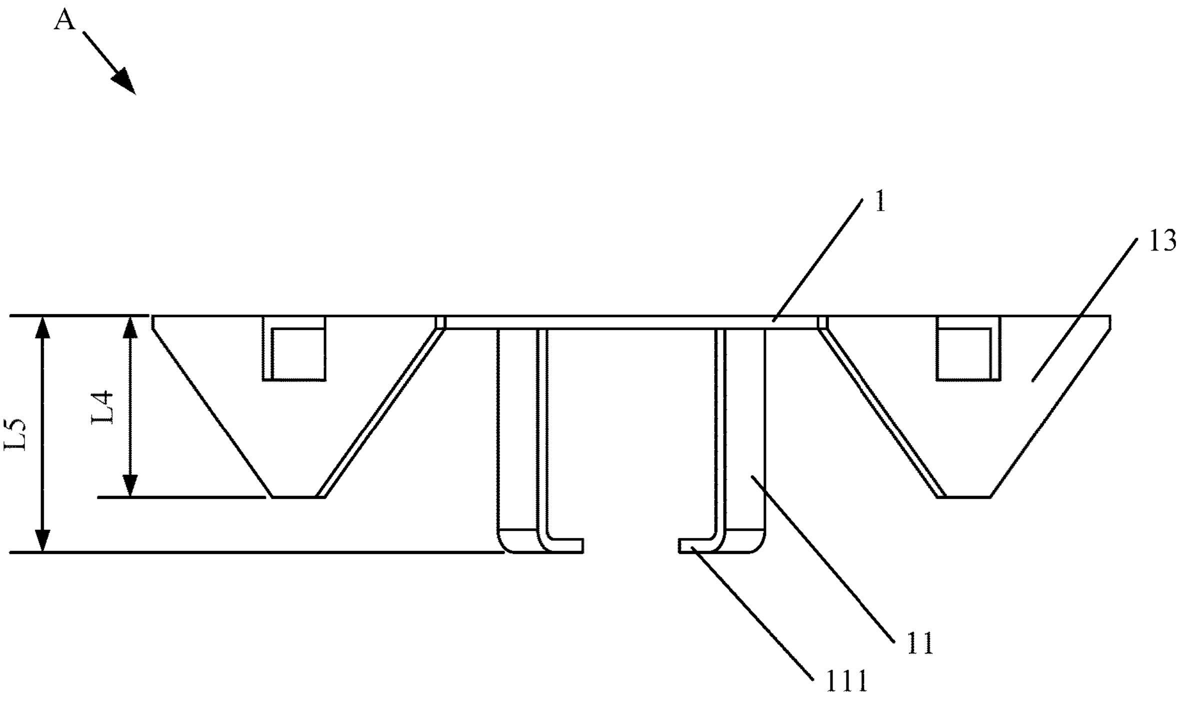
FIG. 4 is a schematic diagram of a front view size of an antenna vibrator provided by a first embodiment of the present application.

With reference to FIG. 4, in this embodiment, a bending angle of the bending angle portion 13 is 90°, that is, the bending angle portion 13 is vertical to the radiation board 1. Further, a height L4 of the bending angle portion 13 is greater than or equal to 0.045 center frequency wavelength and is less than or equal to 0.105 center frequency wavelength. It should be noted that the antenna has a certain operating frequency range, and in this range, the antenna has the minimum impedance and the highest efficiency. The middle optimum point of the operating frequency range is center operating frequency, and the center frequency wavelength refers to the wavelength of the center operating frequency. In an implementation, the height L4 of the bending angle portion 13 is set to 0.075 center frequency wavelength. Therefore, the isolation of the antenna vibrator A may be increased and the array cross-polarization ratio is optimized by providing the bending angle portion 13.

Figure 3:
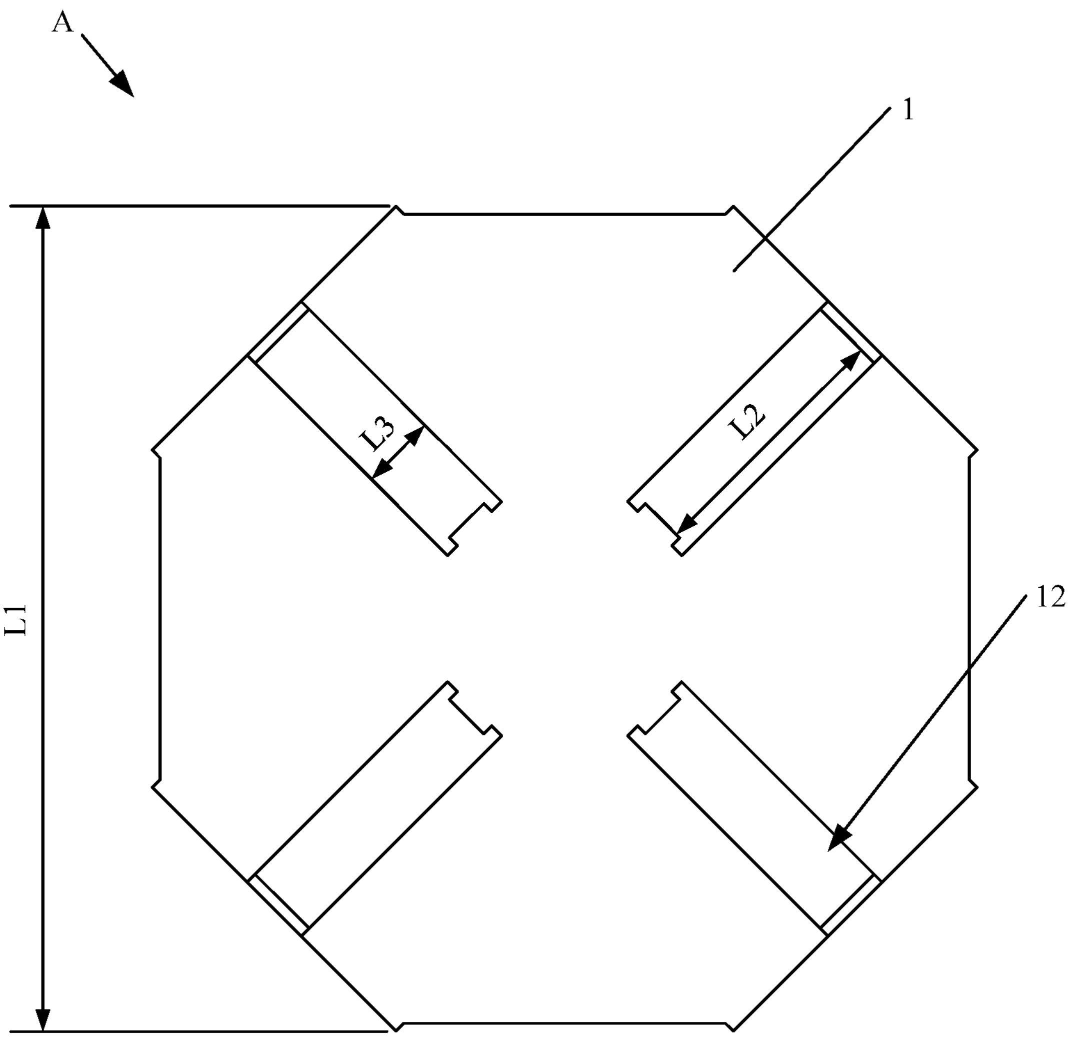
FIG. 3 is a schematic diagram of a top view size of an antenna vibrator provided by a first embodiment of the present application.

With reference to FIG. 3, in this embodiment, corresponding to the structure of the square radiation board 1 improved by the antenna vibrator A, and a side length L1 of the square radiation board 1 is greater than or equal to 0.32 center frequency wavelength and is less than or equal to 0.42 center frequency wavelength. In an implementation, the side length L1 of the radiation board 1 is set to 0.37 center frequency wavelength, that is, the antenna vibrator A is formed by stamping a metallic sheet with a side length being 0.37 center frequency wavelength, and a relative bandwidth of a working frequency of the antenna vibrator A is 14.3%. Furthermore, there are four hollowed holes 12 which form rectangular through holes. The four hollowed holes 12 are uniformly distributed at a diagonal line of the radiation board 1, and form a centrally symmetrical cross shape. At the same time, each hollowed hole 12 corresponds to one bending angle portion 13 and one support portion 11.

Further, with reference to FIGS. 1 and 2, a diagonal line of the radiation board 1 is vertical to a plane in which the corresponding bending angle portion 13 is located. That is to say, the bending angle 13 bends along a straight line which is vertical to the diagonal line on the radiation board 1, such that the bending angle portion 13 forms an axisymmetrical structure. At the same time, a plurality of bending angle portions 13 also form a centrosymmetric structure about the radiation board 1. Therefore, stability of a phase center of the antenna is ensured.

As shown in FIG. 1, in this embodiment, the hollowed hole 12 includes a main part 121 and a deflection part 122, where the deflection part 122 is located on the bending angle portion 13. That is to say, the bending angle portion 13 bends along a straight line which is vertical to the diagonal line of the radiation board 1 and passes through the hollowed hole 12, to enable the rectangular hollowed hole 12 to be divided to two parts that are rectangles. Further, as shown in FIG. 3, a side length of the main part 121 is parallel to the corresponding diagonal line on the radiation board 1, and a length L2 is greater than or equal to 0.09 center frequency wavelength and is less than or equal to 0.15 center frequency wavelength. In an implementation, the length L2 of the main part 121 is set to be 0.12 center frequency wavelengths.

With reference to FIGS. 1 and 2, in this embodiment, the support portion 11 bends downward along an inner edge of the hollowed hole 12, that is, the support portion 11 bends downward along an inner edge of the main part 121. In other words, the support portion 11 is located on an inward side. In an implementation, a bending angle of the support portion 11 is 90°, that is, the support portion 11 is perpendicular to the radiation board 1. Thus, after the antenna vibrator A is connected to a feed member B through the support portion 11, the radiation board 1 is kept parallel to an antenna cover C, so that propagation effect of electromagnetic wave is ensured.

As shown in FIGS. 2 and 4, in this embodiment, the lower end of the support portion 11 is bent inwards to form a connecting portion 111, and the antenna vibrator A is electrically connected to the feed member B through the connecting portion 111. In an implementation, a bending angle of the connecting portion 111 is 90°, that is, the connecting portion 111 is perpendicular to the support portion 11 and parallel to the radiation board 1. Thus, after the antenna vibrator A is electrically connected through the connecting portion 111, the radiation board 1 is kept parallel to an antenna cover C, so that propagation effect of electromagnetic wave is ensured.

It should be noted that there are four support portions 11, and the number of connecting portion 111 corresponds to four. Thus, the antenna vibrator A is connected to four feed points on the feed member B through four connecting portions 111, that is, a four-point feeding manner is used to ensure stability of an antenna phase center.

As shown in FIG. 4, in this embodiment, the height L5 of the support portion 11 is greater than or equal to 0.06 center frequency wavelengths and less than or equal to 0.12 center frequency wavelengths. In an implementation, a height L5 of the support portion 11 is set to 0.09 center frequency wavelength.

With reference to FIGS. 1 to 3, in this embodiment, a width of the hollowed hole 12 is parallel to an adjacent side of the radiation board 1. Further, a width L3 of the hollowed hole 12 is greater than or equal to 0.025 center frequency wavelength and is less than or equal to 0.045 center frequency wavelength. In an implementation, the width L3 of the hollowed hole 12 is set to 0.035 center frequency wavelength. It may be easily understood that the hollowed hole 12 may also be set to other shapes, and the shape of support portion 11 corresponds to the hollowed hole 12.

According to a first embodiment of the present application, the bending angle portion 13 is provided on the radiation board 1 of the antenna vibrator A, such that improved designs for a radiation surface of the antenna vibrator A are implemented, thereby achieving that isolation of the antenna vibrator A is optimized, and a cross-polarization ratio after the antenna vibrator A is arrayed is optimized, which enables the array cross-polarization ratio to meet a conventional indicator in a case of not adding a boundary condition.

Figure 5:
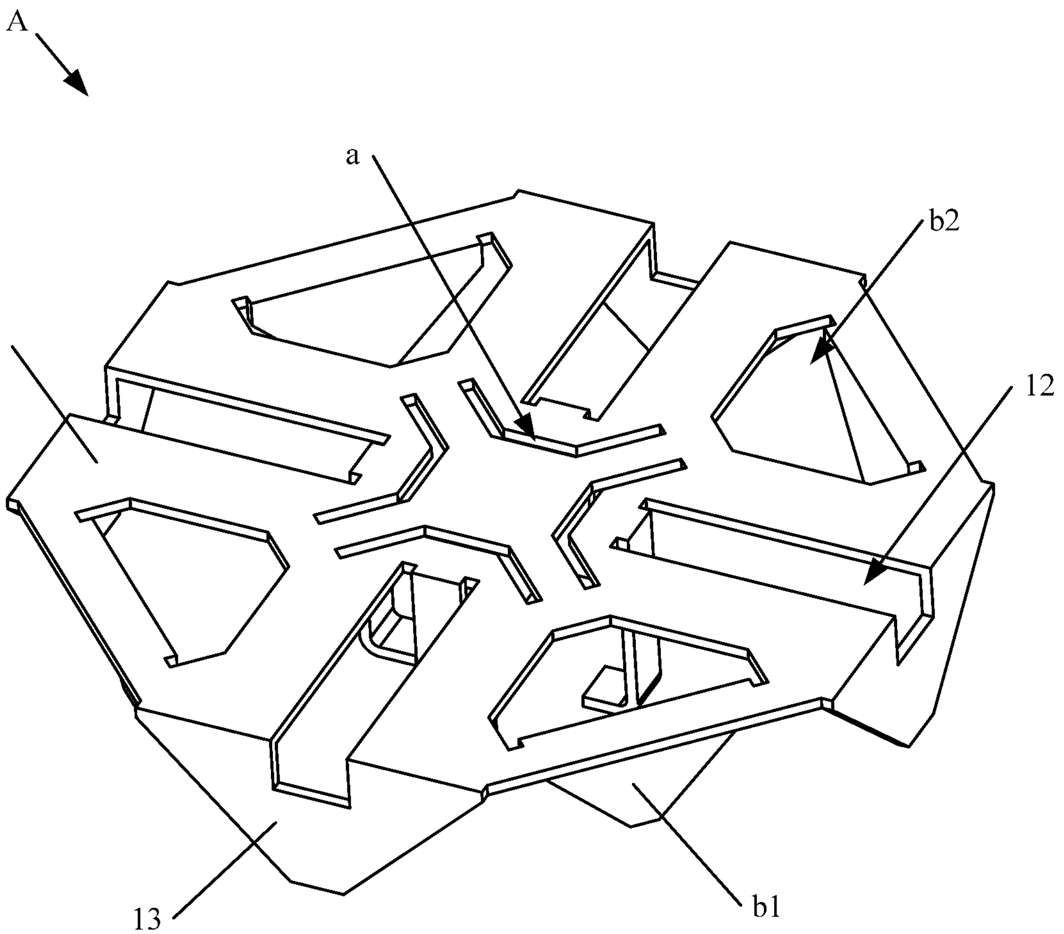
FIG. 5 is a schematic structural diagram of an antenna vibrator provided by a second embodiment of the present application.
Figure 6:
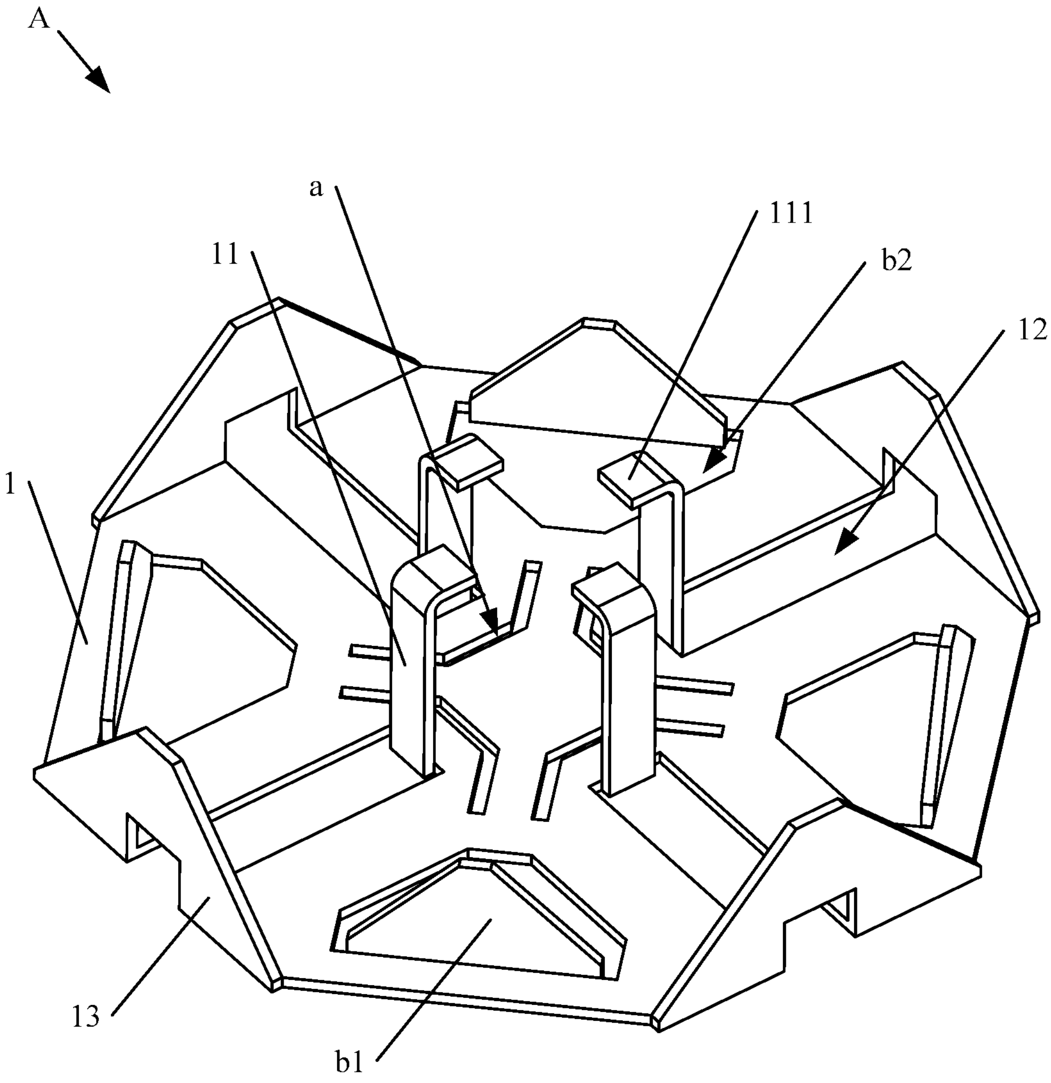
FIG. 6 is a schematic structural diagram of another view of an antenna vibrator provided by a second embodiment of the present application.

As shown in FIGS. 5 and 6, the second embodiment of the present application further provides an antenna vibrator A. Part of structure of the antenna vibrator A is described as above, and details are not described herein again. It should be noted that the antenna vibrator A further includes a plurality of slits a and/or a plurality of bending portions b1, that is, the antenna vibrator A may include the bending angle portion 13 and the slit a simultaneously, may also include the bending angle portion 13 and the bending portion b1 simultaneously, and may further include the bending angle portion 13, the slit a, and the bending portion b1 simultaneously. Therefore, the slit a and/or the bending portion b1 is provided based on the provided bending angle portion 13, such that the isolation of the antenna vibrator A and the array cross-polarization ratio may be further optimized.

Specifically, in an implementation, the antenna vibrator A includes the bending angle portion 13 and the slit a simultaneously, where the slit a is located in the central region of the radiation board 1, that is, in an inner region of the plurality of hollowed holes 12, and at the same time, the number and distribution of the slits a match the hollowed holes 12. More specifically, corresponding to the four rectangular hollowed holes 12, the four slits a respectively include a slit main body parallel to the width of the adjacent hollowed hole 12 and two symmetric extension parts inclined outwards from both ends of the slit main body. It should be noted that an angle between the slit main body of the slit a and the extension part is 135°. In another aspect, the width of the slit a may be set as required, and the length of the slit a is greater than or equal to 0.05 center frequency wavelengths and less than or equal to 0.25 center frequency wavelengths. The length of the slit main body of the slit a is greater than or equal to 0.04 center frequency wavelength and less than or equal to 0.06 center frequency wavelength. Thus, the antenna vibrator A is additionally provided with the slit a, so that the isolation of the antenna vibrator A and the cross-polarization ratio of the array are further optimized.

In another implementation, the antenna vibrator A includes both the bending angle portion 13 and the bending portion b1. The radiation board 1 bends downward in a region between two adjacent hollowed holes 12 to form a plurality of bending portions b1 and a plurality of additional hollowed holes b2. More specifically, corresponding to four rectangular hollowed holes 12, four additional hollowed holes b2 are provided to be in an isosceles trapezoidal shape, an upper line with a shorter length is close to the center of the radiation board 1, a lower line with a longer length is close to the edge of the radiation board 1, and the upper line and the lower line are parallel to adjacent sides of the radiation board 1. In another aspect, two waists of the additional hollowed hole b2 are respectively parallel to an adjacent diagonal line, that is, the two waists are vertical to each other. It should be noted that a length of the lower line of the additional hollowed hole b2 is greater than or equal to 0.07 center frequency wavelength and less than or equal to 0.13 center frequency wavelength, and at the same time, a height of the additional hollowed hole b2 is greater than or equal to 0.05 center frequency wavelength and less than or equal to 0.09 center frequency wavelength. It may be easily understood that the additional hollowed hole b2 may also be set to other shapes, and the shape of the bending portion b1 corresponds to the additional hollowed hole b2. Therefore, the antenna vibrator A is additionally provided with the bending portion b1, such that the isolation of the antenna vibrator A and the array cross-polarization ratio are further optimized.

In another implementation, the antenna vibrator A includes the bending angle portion 13, the slit a, and the bending portion b1 simultaneously, where structure features of the slit a and the bending portion b1 are as described above, and details are not described herein again. It may be easily understood that the antenna vibrator A is additionally provided with both the slit a and the bending portion b1, such that the isolation of the antenna vibrator A and the array cross-polarization ratio are further optimized.

According to a second embodiment of the present application, the slit a and/or the bending portion b1 is additionally provided based on the provided bending angle portion 13, such that improved designs for a radiation surface of the antenna vibrator A are implemented, thereby achieving that the isolation of the antenna vibrator A and the cross-polarization ratio after the antenna vibrator A is arrayed are further optimized, which enables the array cross-polarization ratio to meet a conventional indicator in a case of not adding a boundary condition.

Figure 7:
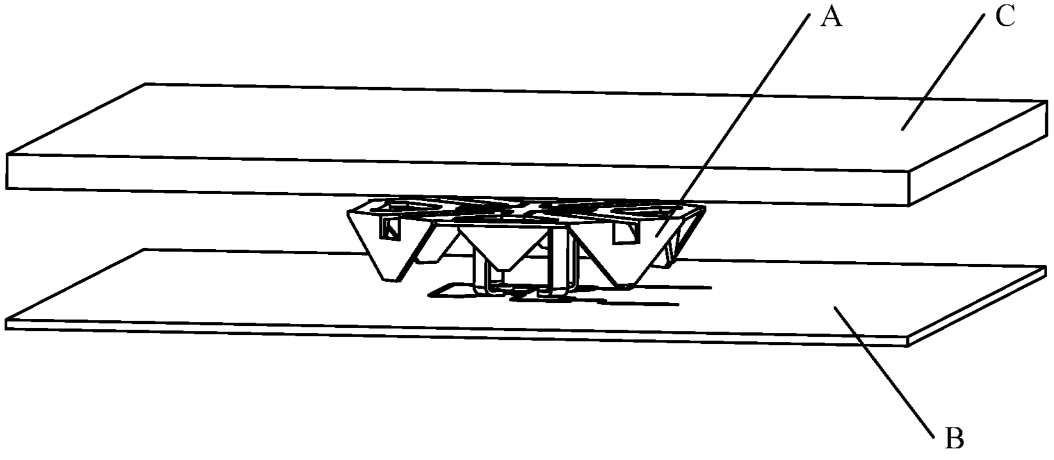
FIG. 7 is a schematic structural diagram of an antenna provided by a third embodiment of the present application.
Figure 8:
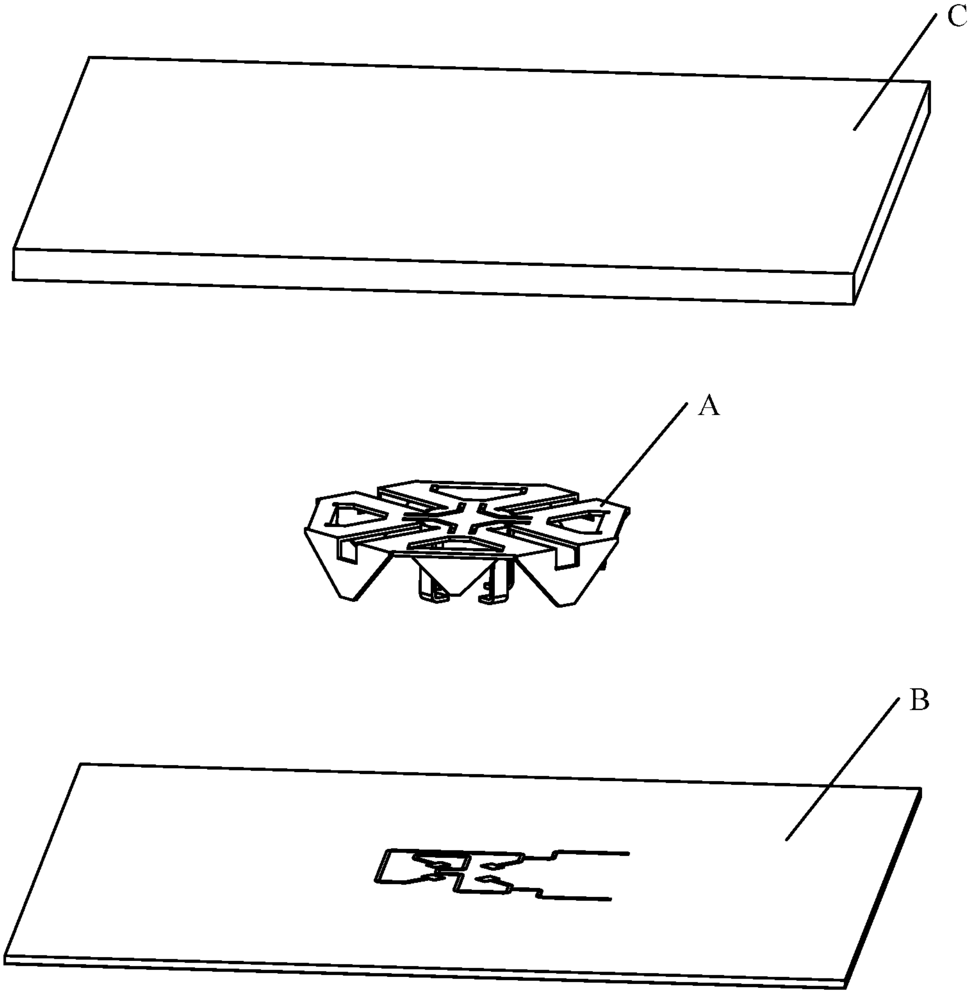
FIG. 8 is an explosion schematic diagram of an antenna provided by a third embodiment of the present application.

As shown in FIGS. 7 and 8, a third embodiment of the present application provides an antenna, including an antenna vibrator A, a feed member B, an antenna cover C, and a reflection board. A structure of the antenna vibrator A is described as above, and details are not described herein again. The antenna vibrator A is electrically connected to the feed member B through the connecting portion 111 on the support portion 11, and the antenna cover C covers the antenna vibrator A.

Specifically, the feed member B includes a circuit board, and one side of the circuit board facing the antenna vibrator A is provided with a feed circuit. A connecting portion of the antenna vibrator A is connected to a feed point of the feed circuit by means of fully automatic reflow soldering (surface-mount soldering) or other manners, so that assembly manpower and assembly time may be saved. The antenna cover C is made of materials such as polyvinyl chloride or fiber glass-reinforced plastics, so as to play a role of packaging protection.

According to a third embodiment of the present application, the bending angle portion 13 is provided on the antenna vibrator A, or the slit a and/or the bending portion b1 is additionally provided based on this, such that improved designs for a radiation surface of the antenna vibrator A are implemented, thereby achieving that the isolation of the antenna vibrator A and the cross-polarization ratio after the antenna vibrator A is arrayed are optimized, which enables the array cross-polarization ratio to meet a conventional indicator in a case of not adding a boundary condition.

The embodiments of the present application provide an antenna vibrator and an antenna, and the antenna vibrator includes a radiation board. The radiation board is a polygon, a part of the radiation board bends downward to form a plurality of support portions and a plurality of hollowed holes, and a plurality of corners of the radiation board bend downward to form a plurality of bending angle portions. The support portion serves to support and connect. At the same time, by forming the bending angle portion on the radiation board, isolation of the vibrator is optimized, and after the vibrator is arrayed, a cross-polarization ratio meets a conventional indicator in a case of not adding a boundary condition.

The above description is only the preferred embodiment of the disclosure and is not intended to limit the disclosure, and various modifications and changes may be made in the disclosure for those skilled in the art. Any modification, equivalent replacement, or improvement made within the spirit and principle of the disclosure should be inclusive in the protection scope of the disclosure.

We claim:

1. An antenna vibrator, wherein the antenna vibrator comprises: a radiation board, wherein the radiation board is a polygon, parts of the radiation board bend downwards to form a plurality of support portions and a plurality of hollowed holes, and a plurality of corners of the radiation board bend downwards to form a plurality of bending angle portions, the bending angle portions are vertical to the radiation board; and wherein a region between every two adjacent hollowed holes on the radiation board, each respective region bends downwards to form a bending portion and an additional hollowed hole, the additional hollowed hole is provided to be in a trapezoidal shape with a shorter upper line closer to a center of the radiation board and a longer lower line closer to an edge of the radiation board, and a shape of the bending portion corresponds to the additional hollowed hole.

2. The antenna vibrator according to claim 1, wherein a height of each bending angle portion is greater than or equal to 0.045 center frequency wavelengths and is less than or equal to 0.105 center frequency wavelengths.

3. The antenna vibrator according to claim 1, wherein a side length of the radiation board is greater than or equal to 0.32 center frequency wavelengths and less than or equal to 0.42 center frequency wavelengths; wherein the plurality of hollowed holes comprises four hollowed holes which are uniformly distributed at a diagonal line of the radiation board.

4. The antenna vibrator according to claim 3, wherein a diagonal line of the radiation board is vertical to a plane in which each corresponding bending angle portion is located.

5. The antenna vibrator according to claim 1, wherein each hollowed hole comprises a main part and a deflection part on the bending angle portion; the main part is a rectangle, and a length of the main part is greater than or equal to 0.09 center frequency wavelengths and is less than or equal to 0.15 center frequency wavelengths.

6. The antenna vibrator according to claim 1, wherein each support portion is bent downwards along an inner edge of the hollowed hole.

7. The antenna vibrator according to claim 1, wherein a lower end of each support portion is bent to form a connecting portion.

8. The antenna vibrator according to claim 1, wherein the height of each support portion is greater than or equal to 0.06 center frequency wavelengths and less than or equal to 0.12 center frequency wavelengths.

9. The antenna vibrator according to claim 1, wherein each hollowed hole is rectangular, and a width of the hollowed hole is greater than or equal to 0.025 center frequency wavelengths and is less than or equal to 0.045 center frequency wavelengths.

10. An antenna, comprising: a feed member; the antenna vibrator according to claim 1, wherein the antenna vibrator is electrically connected to the feed member through the support portion; and an antenna cover covering the antenna vibrator.

11. The antenna according to claim 10, wherein a height of each bending angle portion is greater than or equal to 0.045 center frequency wavelengths and is less than or equal to 0.105 center frequency wavelengths.

12. The antenna according to claim 10, wherein a side length of the radiation board is greater than or equal to 0.32 center frequency wavelengths and less than or equal to 0.42 center frequency wavelengths; wherein the plurality of hollowed holes comprises four hollowed holes which are uniformly distributed at a diagonal line of the radiation board.

13. The antenna according to claim 12, wherein a diagonal line of the radiation board is vertical to a plane in which the corresponding bending angle portion is located.

14. The antenna according to claim 10, wherein each hollowed hole comprises a main part and a deflection part on the bending angle portion; the main part is a rectangle, and a length of the main part is greater than or equal to 0.09 center frequency wavelengths and is less than or equal to 0.15 center frequency wavelengths.

15. The antenna according to claim 10, wherein each support portion is bent downwards along an inner edge of the hollowed hole.

16. The antenna according to claim 10, wherein a lower end of each support portion is bent to form a connecting portion.

17. The antenna according to claim 10, wherein the height of each support portion is greater than or equal to 0.06 center frequency wavelengths and less than or equal to 0.12 center frequency wavelengths.

18. The antenna according to claim 10, wherein each hollowed hole is rectangular, and a width of each hollowed hole is greater than or equal to 0.025 center frequency wavelengths and is less than or equal to 0.045 center frequency wavelengths.

* * * * *